3,100,439
EMBOSSING APPARATUS AND METHOD FOR ADJUSTING THE LENGTH OF AN EMBOSSING ROLL

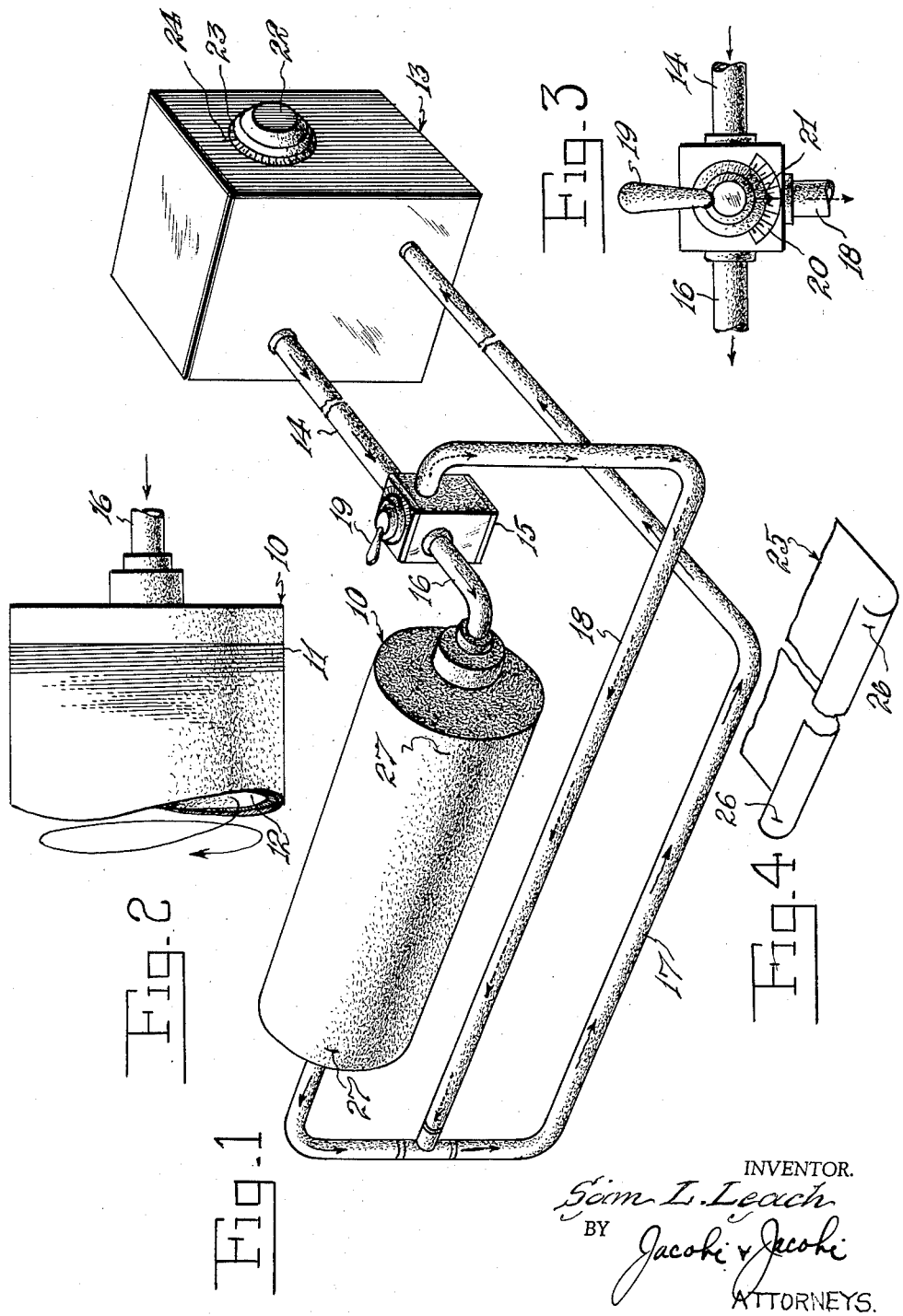

Sam L. Leach, Owensboro, Ky., assignor to PID Corporation, Beverly Hills, Calif., a corporation of California
Filed Apr. 3, 1961, Ser. No. 100,351
5 Claims. (Cl. 101—32)

This invention relates to the graphic arts and more particularly to an embossing apparatus and method for adjusting the length of an embossing roll to be utilized in connection with an embossing or printing operation in which an extremely close dimensional relationship must be maintained between the embossing or printing roll and the material upon which an impression is to be made.

In the production of three dimensional or stereoscopic pictures for use in periodicals or for display purposes, it has been found that satisfactory pictures may be provided by reproducing a picture on a sheet of paper in which the picture comprises a plurality of contiguous right and left hand images originally produced in a camera having a lenticular screen through which the subject matter is photographed. It has also been found that by printing or otherwise applying such a picture to a sheet of paper and thereafter providing a lenticular screen having suitable optical characteristics on the sheet of paper and overlying the picture, that the same may be viewed through the lenticular screen to provide three dimensional or stereoscopic properties.

Where this process is to be utilized for periodicals, it is essential that the sheet of paper bearing the picture and the lenticular screen disposed thereover must be relatively thin and flexible. In other words, this composite sheet must have a total thickness not greater than the normal thickness of conventional cover material used in periodicals. In the provision of such a product, it has further been found entirely practical to coat the sheet of paper bearing the photograph with a suitable plastic, which plastic is thereafter embossed on the outer surface thereof to provide a lenticular screen having suitable optical characteristics which yield the desired three dimensional or stereoscopic properties.

The lenticular screen utilized in this product comprises a plurality of elongated parallel convex lenticles which in effect provide a plurality of parallel elongated lenses and if results of suitable high quality are to be obtained, it is essential that an accurate dimensional relationship between the lenticular screen and the picture on the sheet of paper be maintained at all times, regardless of changes of dimension of the paper due to changes in humidity or for any other reasons.

In the manufacture of the product above referred to, it is customary to print the desired picture or pictures on relatively large quantities of paper which may be stored prior to applying the plastic coating thereto and embossing the same to provide the lenticular screen on the finished product. Consequently, on occasion there may be a relatively long period of time between the printing and the embossing operations and during this period of time, changes in humidity conditions may result in changes in the dimensional characteristics of the paper on which the picture or pictures have been printed. As was stated above, the pictures comprise a plurality of elongated parallel contiguous right and left hand images and an extremely accurate relationship must be maintained between such images and the elongated lenticles of the lenticular screen formed thereon. As a consequence, sheets of paper with pictures printed thereon which have been stored for a considerable period of time may well be subject to a sufficient dimensional change to result in a distorted image when the lenticular screen has been applied thereby providing an inferior product.

It, therefore, becomes imperative to provide some means by which the relationship between the lenticles of the lenticular screen and the images of the picture printed on the paper may be controlled in order to provide exact registration therebetween, regardless of changes in dimensions of the picture due to changes in humidity or for any other reason. While it might be possible theoretically to store the printed paper in a room or chamber subject to accurate humidity control, nevertheless, this solution to the problem is not at all practical, in that humidity controlled chambers of any appreciable size are comparatively expensive to construct and furthermore, the operation and maintenance costs of the necessary refrigeration and humidity control equipment are relatively high.

There is also another problem connected with the production of three dimensional or stereoscopic photographs in the manner above described, in that the plastic is applied to the sheet of paper in a heated condition and consequently, the temperature of the embossing roll tends to rise during the embossing operation and where such operation is continued for a sufficient period of time, the temperature of the embossing roll will approach that of the heated plastic. Such a change in the temperature of the embossing roll will, of course, result in changes of the dimensional characteristics thereof, thereby further complicating the problem of providing accurate registration between the lenticles provided in the plastic by the embossing rolls and the contiguous right and left hand images printed on the sheet of paper.

It has been found that an entirely satisfactory and economical solution to this entire problem may be provided by utilizing the thermal expansion or contraction characteristic of the embossing roll in such a manner as to control the dimensions of the roll, and particularly the length thereof, whereby accurate registration between the lenticles in the plastic and the contiguous images printed on the sheet of paper is achieved. This control of the dimensional characteristics of the embossing roll may be accomplished through manually operated controls, or may if desired, be entirely automatic by providing suitable heat sensing and control instruments or apparatus.

It is accordingly an object of the invention to provide a method for adjusting the length of an embossing roll to provide accurate and exact registration between impressions provided by an embossing roll, and graphic representations on a sheet of paper carrying a coating to be embossed by the embossing roll.

A further object of the invention is the provision of a method for adjusting the length of an embossing roll to provide registration between index marks on such roll and corresponding index marks provided on a sheet of paper to be embosesd, such registration being accomplished by controlling the temperature of the embossing roll which in turn controls the dimensions thereof.

A still further object of the invention is the provision of a method for adjusting the length of an embossing roll in which such roll is formed of a material having a known co-efficient of thermal expansion and spaced index marks thereon, which method contemplates embossing a test sheet having corresponding spaced index marks thereon, measuring the displacement between the index marks on the sheet and those embossed thereon, and thereafter adjusting the temperature of the embossing roll to vary the length thereof to cause exact registration between the index marks on the roll and the index marks on the sheet.

Another object of the invention is the provision of a method for adjusting the length of an embossing roll by circulating a cooling medium through the embossing roll and by controlling the temperature of the cooling medium or the quantity thereof circulated through the embossing roll to thereby control the temperature of the embossing roll and the dimensions thereof.

A further object of the invention is the provision of an embossing apparatus for embossing or forming a lenticular screen in a plastic coating on a sheet of paper, which apparatus includes an embossing roll having a known co-efficient of thermal expansion and incorporating means for circulating a cooling fluid therethrough, refrigerating apparatus connected to the embossing roll, and means for controlling the quantity of cooling medium flowing through the embossing roll, in order to control the temperature of the roll, thereby control dimensions thereof.

A still further object of the invention is the provision of an embossing apparatus for embossing or forming a lenticular screen in a plastic coating on a sheet of paper, which apparatus incorporates an embossing roll means for circulating a cooling medium therethrough and spaced index marks on the embossing roll to indicate the registration or displacement of such marks with respect to corresponding marks provided on the sheet of paper to be embossed, a refrigeration system connected to the circulating means, and control means for controlling the temperature of cooling medium circulating through the embossing roll in order to control the temperature thereof and thereby control the dimensions of the roll to provide accurate and exact registration between the index marks thereon and the index marks on the sheet to be embossed.

Further objects and advantages of the invention will be apparent from the following description taken in conjunction with the accompanying drawings wherein:

FIG. 1 is a diagrammatic view in perspective showing an embossing roll, together with a refrigeration system and control means connected thereto for the purpose of controlling the temperature of the roll and thereby controlling the dimensional characteristics thereof;

FIG. 2 a fragmentary view in elevation with parts in section and broken away for greater clarity and showing the structure of the embossing roll with the design to be embossed thereon and the manner in which cooling medium may be circulated through the roll;

FIG. 3 a fragmentary top plan view of the by-pass valve utilized in controlling the flow of cooling medium through the embossing roll; and FIG. 4 a view in perspective showing a sheet to be embossed together with the index marks thereon for determining accurate registration between the index marks on the embossing roll and such index marks on the sheet to be embossed.

With continued reference to the drawing, there is shown an embossing apparatus constructed in accordance with this invention and which may well comprise an embossing roll 10 formed of a material having a known co-efficient of thermal expansion. The roll 10 is, of course, mounted in suitable bearings for rotation and is driven by suitable power means (not shown). Since the specific mounting of the roll 10 together with the driving means and associated equipment forms no part of the instant invention, the same is not included in the drawing, as this would only confuse the showing and would not in any way contribute to the illustration or description of the instant invention.

As shown in FIG. 2, the roll 10 is provided on the embossing face or surface thereof with a plurality of spaced parallel ribs 11 which constitute the predetermined design to be embossed and for simplicity of illustration, such ribs 11 are shown directly on the surface of the roll 10, whereas in actual practice, such ribs or other design would normally be provided on a separate plate which would be attached to the roll 10 in firm engagement with the surface thereof, thereby permitting the convenient replacement of the embossing design upon wear or damage thereto and without necessitating removal and replacement of the entire roll 10. Also as seen in FIG. 2, the roll 10 is hollow and a passage 12 is provided therethrough for permitting circulation of a suitable cooling medium in a manner to be presently described.

A refrigeration system 13 which may be entirely conventional in structure is provided for supplying cooling medium to the passage 12 of the roll 10. To this end, there may be provided a cooling medium supply conduit 14 connected to the refrigeration system 13, and through a by-pass valve 15 and a conduit 16, with the passage 12 in the roll 10. A cooling medium return conduit may be connected from the opposite end of the roll 10 to the refrigeration system 13. The by-pass valve 15 may be connected through a by-pass conduit 18 with the return conduit 17, and the by-pass valve 15 may be provided with control means in the form of a finger engaging knob 19, there being a suitable scale 20 on the by-pass valve and a pointer or other index mark 21 on the knob 19 for indicating the adjustment of the by-pass valve 15 in a manner to be presently described. Also if desired, the refrigeration system 13 may be provided with a suitable control means in the form of an adjusting dial 22 having a scale 23 thereon and a suitable index mark or pointer 24 for permitting accurate adjustment of the dial 22 in order to adjust the temperature of the cooling medium supplied by the refrigeration system 13.

As shown in FIG. 4, a sheet of paper 25 which forms part of a sheet structure to be embossed is provided with spaced index marks or indices 26 thereon and such index marks would normally be disposed marginally outside of a picture or other image printed on the sheet of paper 25. It is to be assumed that sheet 25 is part of a roll sheet structure or stack sheet structure and that such sheet of paper 25 is provided with a series of right and left hand contiguous parallel images in the manner described above, and which upon application of a lenticular screen to the surface thereof, will provide a three dimensional or a stereoscopic picture. Also the embossing roll 10 is provided with spaced embossing index means 27, and when accurate or proper registration is provided between the embossing roll 10 and the sheet structure 25, the embossing index means 27 on the roll 10 will coincide with the indices 26 on the sheet structure 25. In utilizing the apparatus and carrying out the method of this invention, a test sheet 25 (one sheet of a sheet stack structure, or a portion of a sheet roll structure) is run through the apparatus in order to emboss the same, and if there is any displacement between the index marks 26 on the sheet 25 and the embossing index means 27 on the roll 10 which, of course, emboss corresponding indices in the plastic on the sheet 25, such discrepancy may be accurately measured by utilizing a microscope incorporating a measuring reticle. Upon determining the displacement between the first index marks or indices 26 on the sheet and the second indices formed on the sheet by the embossing index means, correction may be made in order to provide future accurate registration between the index marks 26 on other portions of the sheet structure and the embossing index means 27 on the roll. This merely requires changing the temperature of the roll 10. From the amount indicated by such displacement, the necessary change may be conveniently calculated from the known coefficient of thermal expansion of the roll 10, in that a given change in temperature of the roll 10 will result in a corresponding change in dimensions of such roll. Consequently, a suitable table or chart may be prepared covering all possible conditions, and it is only necessary to measure the discrepancy or displacement between the index marks on the sheet and the index marks embossed thereon by the roll 10 which by reference to the chart or table indicates the change in temperature necessary in the roll 10 to provide accurate registration. Such change in temperature may be provided by adjustment of the by-pass valve 15, or if desired, by adjustment of the control dial 22 on the refrigeration system 13. Moreover, if desired, the chart or table may indicate the necessary setting of the finger engaging knob 19 on the by-pass valve 15, or may indicate the necessary setting of the dial 22 on the refrigeration system 13, in order to provide the proper temperature of the roll 10 to avoid non-registration.

The embossing index means 27 are disposed axially of the embossing roll 10, and separate from the design to be embossed thereby. Such embossing index means 27 can be either in the form of recesses in the embossing face of the roll 10 or projections extending from the embossing face. In any event, the embossing index means 27 serve to provide additional or second index marks on the sheets embossed by the roll, which second or additional index marks, as explained above, are used with the first index marks 26 to ascertain improper registration and to thereby provide the basis for proper temperature control of the embossing roll to insure proper aligned registration.

While the means for controlling the temperature of the roll 10 has been shown and described as manually operated, nevertheless, if desired, once the necessary conditions of temperature have been ascertained by measuring the displacement between the marks on the test sheet, automatic means in the form of temperature sensing devices installed on the roll 10 may be utilized to maintain the temperature at a proper value to maintain the dimensions of the roll 10 at a proper value to provide accurate registration. The control method and apparatus of this invention may be utilized to overcome discrepancies caused by changes in dimensions of the paper prior to embossing thereof, and may also be utilized to overcome discrepancies occasioned by changes in temperature of the embossing roll during operation thereof caused by the contact of such roll with the hot plastic being embossed. As a result of the use of the structure and method of this invention, extremely accurate and highly satisfactory results may be obtained, both for embossing lenticular screens on pictures imprinted on sheets of paper in order to provide stereoscopic or three dimensional pictures and likewise, the process and apparatus of this invention would be applicable for certain printing or other operations.

It will be seen that by the above described invention there has been provided a relatively simple, yet highly effective apparatus and process for providing accurate embossing operations, regardless of changes in temperature or changes in size of paper to be embossed due to humidity or other reasons and furthermore, this apparatus and process may be adapted to various types of apparatus without material modification thereof.

It will be obvious to those skilled in the art that various changes may be made in the invention without departing from the spirit and scope thereof, and therefore the invention is not limited by that which is shown in the drawing and described in the specification, but only as indicated in the appended claims.

What is claimed is:

1. A method of adjusting the length of an embossing roll, having a known coefficient of thermal expansion, to provide aligned registration between the embossing face of said roll and an image carried on an embossable sheet structure to be embossed thereby, said method comprising the steps of:

(a) providing first spaced marginal indices on at least a portion of said sheet structure;

(b) providing spaced embossing indices on said embossing roll corresponding to said first spaced indices and registrable therewith when there is proper aligned registration between said first indices on said sheet structure and said embossing indices;

(c) embossing a test portion of said sheet structure having at least two of said first indices thereon with said embossing roll to provide on said test portion of said sheet structure as embossed, second spaced indices formed by and corresponding to said embossing indices;

(d) measuring the displacement between corresponding of said first and second indices on said test portion of said sheet structure as embossed; and (e) adjusting the temperature of said embossing roll in accordance with the measured displacement between corresponding of said first and second indices to change the length of said embossing roll by an amount sufficient to cause exact aligned registration between corresponding of said first and embossing indices on other portions of said sheet structure.

2. A method of adjusting the length of an embossing roll, having a known coefficient of thermal expansion, to provide aligned registration between the embossing face thereof and an image carried on an embossable sheet structure to be embossed thereby, said method comprising the steps of:

(a) providing first spaced marginal indices on at least a portion of said sheet structure;

(b) providing embossing indices on said embossing roll corresponding to said first spaced indices and registrable therewith when there is proper aligned registration between said first indices on said sheet structure and said embossing indices;

(c) circulating a cooling medium through said embossing roll;

(d) embossing a test portion of said sheet structure having at least two of said first indices thereon with said embossing roll to provide on said test portion of said sheet structure as embossed, second spaced indices formed by and corresponding to said embossing indices;

(e) measuring the displacement between corresponding of said first and second indices on said test portion of said sheet structure as embossed; and (f) adjusting the temperature of said cooling medium circulating through said embossing roll in accordance with the measured displacement between corresponding of said first and second indices to change the length of said embossing roll by an amount sufficient to cause exact aligned registration between corresponding of said first and embossing indices on other portions of said sheet structure.

3. An embossing apparatus comprising an embossing roll of a material having a known coefficient of thermal expansion, said roll having an embossing face with a predetermined design thereon, spaced embossing index means on said roll separate from said design for embossing indices on a structure embossed by said roll, said roll having a passage therein for accommodating a cooling medium in heat exchange relationship thereto, a refrigeration system, a cooling medium supply conduit connecting said refrigeration system and said passage, a cooling medium return conduit connecting said passage and said refrigeration system, an adjustable by-pass valve in said supply conduit and a by-pass conduit connecting said valve and said return conduit whereby said valve may be adjusted to control the flow of cooling medium through said passage and control the temperature of said roll thereby controlling the length of said roll and distance between said embossing index means.

4. An embossing apparatus comprising an embossing roll of a material having a known coefficient of thermal expansion, said roll having an embossing face with a predetermined design thereon, longitudinally spaced embossing index means on said roll separate from said design for embossing indices on a structure embossed by said roll, said roll having a passage therein for accommodating a cooling medium in heat exchange relationship thereto, a refrigeration system, a cooling medium supply conduit connecting said refrigeration system and said passage, a cooling medium return conduit connecting said passage and said refrigeration system, and control means for adjusting the temperature of said cooling medium to thereby adjust the length of said roll and distance between said longitudinally spaced embossing index means.

5. An embossing apparatus comprising an embossing roll of a material having a known coefficient of thermal expansion, said roll having an embossing face with a predetermined design thereon, axially spaced embossing index means on said roll separate from said design for embossing indices on a structure embossed by said roll, and means for controllably adjusting the temperature of said roll to adjust the length of said roll and distance between said axially spaced embossing index means.

References Cited in the file of this patent

UNITED STATES PATENTS

| | | |
|---|---|---|
| 2,063,770 | Taylor | Dec. 8, 1936 |
| 2,151,570 | Shoults et al. | Mar. 21, 1939 |
| 2,697,463 | Desrosier | Dec. 21, 1954 |
| 2,849,951 | Heinrich | Sept. 2, 1958 |